United States Patent [19]

Kaiser et al.

[11] 3,915,957

[45] Oct. 28, 1975

[54] DIGITOXIGENIN ALPHA-L-ARABINOSIDE COMPOUNDS AND THERAPEUTIC COMPOSITIONS FOR COMBATING CARDIAC INSUFFICIENCY

[75] Inventors: Fritz Kaiser, Lampertheim; Hans Joachim Lubs, Weinheim; Wolfgang Schaumann, Heidelberg; Wolfgang Voigtländer, Viernheim, all of Germany

[73] Assignee: Boehringer Mannheim GmbH, Mannheim-Waldhof, Germany

[22] Filed: Mar. 11, 1974

[21] Appl. No.: 450,255

[30] Foreign Application Priority Data
Apr. 19, 1973 Germany.......................... 2319874

[52] U.S. Cl.............................. 260/210.5; 424/182
[51] Int. Cl.².......................................... C07J 19/00
[58] Field of Search................................ 260/210.5

[56] References Cited
UNITED STATES PATENTS
3,476,742  11/1969  Voigtlander et al............ 260/210.5
3,753,975  8/1973  Kaiser et al...................... 260/210.5
3,836,520  9/1974  Stache et al..................... 260/210.5

OTHER PUBLICATIONS
Pigman, The Carbohydrates, p. 79, Academic Press Inc., New York. 1957.

Primary Examiner—Johnnie R. Brown
Assistant Examiner—Cary Owens
Attorney, Agent, or Firm—Burgess, Dinklage & Sprung

[57] ABSTRACT

New digitoxigenin α-L-arabinoside compound of the formula

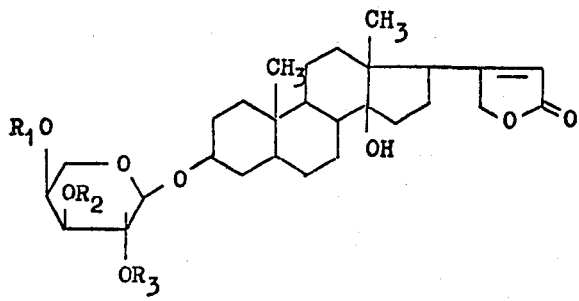

wherein
$R_1$, $R_2$ and $R_3$, which may be the same or different, are acyl (i.e., alkanoyl) or alkyl of up to 3 carbon atoms and one or two of $R_1$, $R_2$ and $R_3$ can also be hydrogen atoms;
$R_1$ and $R_2$ together can represent an acetal or ketal grouping containing from 2 to 10 carbon atoms, are outstandingly effective in the oral therapy of cardiac insufficiency.

15 Claims, No Drawings

NEW DIGITOXIGENIN ALPHA-L-ARABINOSIDE COMPOUNDS AND THERAPEUTIC COMPOSITIONS FOR COMBATING CARDIAC INSUFFICIENCY

The present invention relates to new digitoxigenin α-L-arabinoside compounds, with therapeutic compositions containing same, and with therapeutic methods for combating cardiac insufficiency.

The new inventive compounds are derivatives of digitoxigenin α-L-arabinoside of the formula:

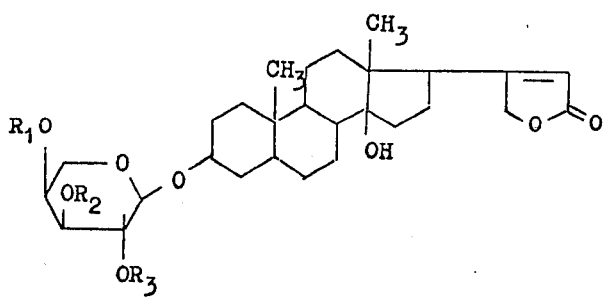

wherein $R_1$, $R_2$ and $R_3$, which may be the same or different, are acyl (i.e., alkanoyl) or alkyl of up to 3 carbon atoms and one or two of $R_1$, $R_2$ and $R_3$ can also be hydrogen atoms;

$R_1$ and $R_2$ together can represent an acetal or ketal grouping containing from 2 to 10 carbon atoms.

Examples of acetal or ketal groupings $R_1 + R_2$ include straight or branched chain alkylidene, cycloalkylidene and aralkylidene radicals.

Digitoxigenin α-L-arabinoside, which is a cardiac glycoside, is not a naturally-occurring compound but can be prepared partially synthetically in good yields. When administered intravenously, it exhibits a good cardiac effectiveness but, because of its unsatisfactory resorption, it cannot be administered enterally.

We have now found that the new compounds of formula (I) according to the present invention possess a high resorption and thus are well suited for the oral therapy of cardiac insufficiency.

The new compounds (I) according to the present invention can be prepared, for example, by the ketalization or acetalization of digitoxigenin α-L-arabinoside and/or by reaction with O-alkylating or O-acylating agents.

The alkylation can be carried out by reaction with appropriate alkylating agents, especially with alkyl halides, dialkyl sulfates or diazoalkanes. The O-acylation can be carried out with all the acylation agents conventionally used in sugar chemistry, especially with acid anhydrides or orthocarboxylic acid esters or with N,N-dialkylamino-carboxylic acid amide dimethyl acetals and subsequent partial hydrolysis.

For the preparation of the acetals or ketals, digitoxigenin α-L-arabinoside is reacted with an appropriate aldehyde or ketone in the presence of an appropriate catalyst. As catalyst, there is preferably used freshly melted zinc chloride, anhydrous copper sulfate, anhydrous calcium sulfate or an ion exchanger. Instead of aldehydes and ketones, there can be used reactive derivatives thereof, for example the polymeric and oligomeric aldehydes, as well as the lower dialkylketals and acetals and the diacyl derivatives.

The following Examples are given for the purpose of illustrating the present invention. The $hR_F$ values given therein were measured on Merck thin layer finished plates "Silicagel F 254"; impregnation with 20% formamide in acetone; eluent xylene-methyl ethyl ketone (2:3) + 5% formamide; detection with trichloroacetic acid-chloramine reagent; fluorescence upon irradiating with ultra-violet light $\lambda = 366$ nm.

EXAMPLE 1

Preparation of Triacetyl-digitoxigenin-α-L-arabinoside 1 g digitoxigenin α-L-arabinoside was dissolved in 10 ml pyridine, mixed with 5 ml acetic anhydride and left to stand for 20 hours at ambient temperature. Thereafter, the reaction mixture was diluted with water, shaken out with chloroform and the chloroform solution washed with 2N sulfuric acid and then with water, whereafter it was dried over anhydrous sodium sulfate and evaporated in a vacuum. The crude product thus obtained was dissolved in chloroform, decolorized with charcoal and filtered over silica gel. The filtrate was evaporated and the residue recrystallized from ether-petroleum ether. There were obtained 820 mg triacetyl-digitoxigenin α-L-arabinoside; m.p. 119°–121°C; $hR_F$ value 64.

EXAMPLE 2

Preparation of 4'-Acetyl-digitoxigenin α-L-arabinoside 1 g digitoxigenin α-L-arabinoside in 20 ml anhydrous tetrahydrofuran was mixed with 20 ml orthoacetic acid triethyl ester and 2 g anhydrous zinc chloride and stirred for 6 hours at ambient temperature. Subsequently, 20 ml water were added to the reaction mixture which was then left to stand for 20 hours at ambient temperature and thereafter poured into 200 ml water. After extraction with chloroform, the extract was evaporated in a vacuum and the residue recrystallized from acetone-ether. There were obtained 730 mg 4'-acetyl-digitoxigenin-α-L-arabinoside; m.p. 148°–152°C; $hR_F$ value 24.

EXAMPLE 3

Preparation of 3',4'-Isopropylidene-digitoxigenin α-L-arabinoside 1 g digitoxigenin α-L-arabinoside, dissolved in 9 ml anhydrous acetone and 9 ml dimethoxypropane, was, after the addition of 1 g "Amberlite" IR 120 ($H^+$ form), stirred for 20 hours at ambient temperature. Subsequently, the ion exchanger was filtered off and the filtrate was evaporated in a vacuum. The residue obtained was dissolved in chloroform and the chloroform solution was filtered over aluminum oxide. The crude product obtained after evaporation of the filtrate was recrystallized from chloroform-ether to give 760 mg 3',4'-isopropylidene-digitoxigenin α-L-arabinoside; m.p. 184°–186°C; $hR_F$ value 52.

EXAMPLE 4

Preparation of 2'-Acetyl-3',4'-isopropylidene-digitoxigenin α-L-arabinoside 1 g 3',4'-isopropylidene-digitoxigenin α-L-arabinoside, dissolved in 10 ml pyridine, was mixed with 5 ml acetic anhydride and then left to stand for 20 hours at ambient temperature. The reaction mixture was thereafter diluted with water and shaken out with chloroform. The chloroform phase was washed with 2N sulfuric acid and thereafter with water, dried over anhydrous sodium sulfate and evaporated in a vacuum. The residue was recrystallized from chloroform-ether-petroleum ether to give 690 mg 2'-acetyl-3',4'-isopropylidene-digitoxigenin α-L-arabinoside; m.p. 118°–121°C; hR$_F$ value 69.

EXAMPLE 5

Preparation of 3',4'-Isobutylidene-digitoxigenin α-L-arabinoside 1 g digitoxigenin α-L-arabinoside, dissolved in 10 ml chloroform-methanol, was mixed with 100 ml methyl ethyl ketone and 10 g anhydrous zinc chloride and left to stand for two days at ambient temperature. Thereafter, the reaction mixture was diluted with water, shaken out with chloroform and the chloroform extract evaporated to dryness in a vacuum. For the separation of unreacted digitoxigenin α-L-arabinoside, the crude product was subjected to a multiplicative partitioning with the phase mixture chloroform-carbon tetrachloride-methanol-water (1:1:1:1). The organic phase was evaporated and the residue was dissolved in chloroform, decolorized with charcoal and filtered over silica gel. The filtrate was evaporated and the residue was recrystallized from acetone-ether. There were obtained 530 mg 3',4'-isobutylidene-digitoxigenin α-L-arabinoside; m.p. 179°–181°C; hR$_F$ value 59.

EXAMPLE 6

Preparation of Cyclohexylidene-digitoxigenin α-L-arabinoside 1 g digitoxigenin α-L-arabinoside, dissolved in 100 ml cyclohexanone, was mixed with 10 g anhydrous zinc chloride and left to stand for 20 hours at ambient temperature. After working up the reaction mixture in the manner described in Example 5, followed by recrystallization of the crude product from acetone-ether, there were obtained 560 mg 3',4'-cyclohexylidine-digitoxigenin α-L-arabinoside; m.p. 196°–199°C; hR$_F$ value 62.

EXAMPLE 7

Preparation of 3',4'-n-Propylidene-digitoxigenin α-L-arabinoside 1 g digitoxigenin α-L-arabinoside, 60 ml propionaldehyde and 400 mg zinc chloride were reacted and worked up in the manner described in Example 5 to give, after recrystallization of the crude product from acetone-ether, 490 mg 3',4'-n-propylidene-digitoxigenin α-L-arabinoside; m.p. 153°–156°C; hR$_F$ value 55.

EXAMPLE 8

Preparation of Trimethyl-digitoxigenin α-L-arabinoside 1 g digitoxigenin α-L-arabinoside, dissolved in 12 ml dimethyl acetamide, was mixed with 2.8 g barium hydroxide and 3.6 ml dimethyl sulfate and then stirred for four hours at ambient temperature. Thereafter, the reaction mixture was diluted with 300 ml chloroform, suction filtered over kieselguhr and the kieselguhr then washed with chloroform. 18 ml pyridine were added to the total filtrate, which was then evaporated in a vacuum. The residue was dissolved in 120 ml chloroform and shaken out three times with 20 ml amounts of water. The chloroform phase was then dried over anhydrous sodium sulfate and thereafter filtered and the filtrate evaporated in a vacuum. For the separation of small amounts of diether, the crude product was subjected to a multiplicative partitioning with the phase mixture carbon tetrachloride-ethyl acetate-methanol-water (3:1:2:2). After evaporation of the organic phase and recrystallization of the residue from acetone-ether, there were obtained 860 mg trimethyl-digitoxigenin α-L-arabinoside; m.p. 214°–218°C; hR$_F$ value 59.

EXAMPLE 9

Preparation of 3'-O-Methyl-digitoxigenin α-L-arabinoside 1 g digitoxigenin α-L-arabinoside, dissolved in 13 ml dimethyl formamide and 13 ml toluene, was mixed 1.3 g aluminum oxide, 0.16 g barium hydroxide and 0.3 ml dimethyl sulfate in 1.6 ml toluene and then stirred at ambient temperature. At intervals of thirty minutes, there were further added ten times 0.16 g barium hydroxide and 0.3 ml dimethyl sulfate in 1.6 ml toluene. Thirty minutes after the last addition, the reaction mixture was diluted with 300 ml chloroform, filtered over kieselguhr and the kieselguhr then washed with chloroform. 18 ml pyridine were added to the total filtrate, which was then evaporated in a vacuum. The residue was dissolved in 120 ml chloroform-ethanol (2:1), thereafter shaken out three times with 20 ml amounts of water, dried over anhydrous sodium sulfate and the chloroform-ethanol phase then evaporated to dryness. The crude product obtained contained, in addition to the desired monomethyl ether, various dimethyl ethers. For purification, it was dissolved in benzene-chloroform (1:1) and fractionated over 20 g aluminum oxide. The fractions obtained with 65–70% chloroform gave, after evaporation and recrystallization from chloroform-ether, 390 mg 3'-O-methyl-digitoxigenin α-L-arabinoside; m.p. 186°–190°C; hR$_F$ value 19.

EXAMPLE 10

Preparation of 2'-O-Methyl-3',4'-isopropylidene-digitoxigenin α-L-arabinoside 1 g 3',4'-isopropylidene-digitoxigenin α-L-arabinoside, dissolved in 10 ml dimethyl acetamide, was, after the addition of 2.33 g barium hydroxide and 3.0 ml dimethyl sulfate, stirred for 2 hours at ambient temperature. The reaction mixture was worked up by diluting with 120 ml chloroform, filtering over kieselguhr, washing the kieselguhr with chloroform and adding 18 ml pyridine to the filtrate. The filtrate was then evaporated in a vacuum and the residue was taken up in 120 ml chloroform and washed three times with 20 ml amounts of water. After drying over anhydrous sodium sulfate, the chloroform solution was evaporated to dryness and the residue dissolved in carbon tetrachloride-chloroform (1:1) and then fractionated over 25 g aluminum oxide. The fraction with 50% chloroform gave, aver evaporation and recrystallization of the residue from ether, 720 mg 2'-O-methyl-3',4'-isopropylidene-digitoxigenin α-L-arabinoside; m.p. 139°–141°C; hR$_F$ value 74.

As noted above, the instant compounds are useful and efficacious in the oral therapy of cardiac insufficiency. The following experiments were performed to illustrate the activity of compounds representative of the invention in this regard.

The object of the test procedures was to evaluate the resorption properties of the compounds of the invention as compared to a known material, viz., digitoxigenin arabinoside. The criterion of the effectiveness of the test compounds, when administered enterally, was the determination of that period of time, which, following intraduodenal injection of the compounds to guinea pigs, resulted in ventricular extrasystoles and cardiac arrest.

Test Procedure

Guinea pigs which had been subjected to urethane anesthesia were employed in the tests. A canula was fixedly inserted into the duodenum above the bile-duct juncture. The test glycosides were then intraduodenally injected in the dosages as set forth in the table which follows. In each case, 10 ml/kg of an aqueous solution containing 1% methylcellulose and 5% dimethylacetamide was employed as vehicle for the test compounds. The EKG was followed on the oscilloscope and the exact point was determined at which the first ventricular extrasystoles occurred. If, for a period of 4 seconds no EKG pattern could be observed, it was established that cardiac arrest had occurred.

On an average, there were six animals used per substance and dose. The results are set out in the following table:

TABLE

| Active Compound* | Guinea pigs Intraduodenal, mg/kg | Minutes until death |
|---|---|---|
| Digitoxigenin-arabinoside | 6 | 110 |
| Triacetyl-digitoxigenin-α-L-arabinoside [1] | 6 | 25 |
| 4'-Acetyl-digitoxigenin-α-L-arabinoside [2] | 6 | 30 |
| 3',4'-Isopropyliden-digitoxigen-α-L-arabinoside [3] | 6 | 24 |
| 2'-Acetyl-3',4'-isopropyliden-digitoxigenin-α-L-arabinoside [4] | 6 | 44 |
| 3',4'-Isobutyliden-digitoxigenin-α-L-arabinoside [5] | 6 | 29 |
| 3',4'-Cyclohexyliden-digitoxigenin-α-L-arabinoside [6] | 6 | 40 |
| 3',4'-n-Propyliden-digitoxigenin-α-L-arabinoside [7] | 6 | 32 |
| Trimethyl-digitoxigenin-α-L-arabinoside [8] | 2 | 31 |
| 3'-O-Methyl-digitoxigenin-α-L-arabinoside [9] | 4 | 40 |
| 2'-O-Methyl-3',4'-isopropyliden-digitoxigenin-α-L-arabinoside [10] | 6 | 22 |

*The number in brackets is the preparative example number, above, in which the compound was prepared.

As can be seen from the table, the death of the animals occurs after an appreciably shorter time with the new compounds than with digitoxigenin-arabinoside, i.e., the invention compounds are resorbed better and more quickly than the comparison material.

The new compounds (I) according to the present invention can be administered enterally and parenterally in solid or liquid form. For this purpose, at least one of the new compounds (I) is admixed with a solid or liquid pharmaceutical diluent or carrier. As injection medium, it is preferred to use water which contains the conventional additives for injection solutions, for example, stabilizing agents, solubilizing agents and buffers. Additives of this type include, for example, tartrate and citrate buffers, ethanol, complex-forming agents (such as ethylenediamine-tetraacetic acid and the nontoxic salts thereof) and high molecular weight polymers (such as liquid polyethylene oxide) for viscosity regulation. Solid carrier materials include, for example, starch, lactose, mannitol, methyl cellulose, talc, highly-dispersed silicic acid, high molecular weight fatty acids (such as stearic acid), gelatine, agar-agar, calcium phosphate, magnesium stearate, animal and vegetable fats and solid high molecular weight polymers (such as polyethylene glycols). Compositions suitable for oral administration can, if desired, contain flavoring and/or sweetening agents.

Usually, the compounds of the invention are administered orally, for instance in the form of tablets or pills. The new compounds can also be administerd parenterally, for instance, by intravenous injection. For this purpose, they are employed in the form of injectable solutions in water or isotonic salt solutions.

The compounds according to the present invention are preferably not used as such in undiluted form but are diluted with suitable diluting agents as they are conventionally used as pharmaceutical carriers. Such dilution allows better and more economical use to be made thereof.

For making tablets, pills and other solid forms for medication, uniform dispersion of the active compound throughout the carrier is required. Such a fine and uniform dispersion is achieved, for instance, by intimately mixing and milling the compound according to the present invention with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills and other compressed forms, are the commonly used diluting agents, such as cornstarch, dextrose, lactose, sugar and the like. For making tablets and other compressed medication forms, binders such as pectins, gelatin, gum arabic, methylcellulose, yeast extract, agar, tragacanth, and lubricants such as magnesium stearate, calcium stearate, stearic acid, talc and the like are used.

The amount of inventive compound present in such preparations may, of course, vary. It is necessary that the active ingredient be contained therein in such an amount that a suitable dosage will be ensured. Ordinarily, the preparations should not contain less than about 0.1 mg of the inventive compound. The preferred amount in orally administered preparations such as tablets, pills and the like, is between about 0.2 mg and 1.0 mg per day.

The doses to be administered vary according to the type of action desired, i.e., whether said action is to be digitalization or maintenance. It is, of course, understood that the physician will determine the proper amounts to be given to a patient depending upon the symptons to be alleviated and the patient's condition

What is claimed is:

1. Digitoxigenin α-L-arabinoside compound of the formula

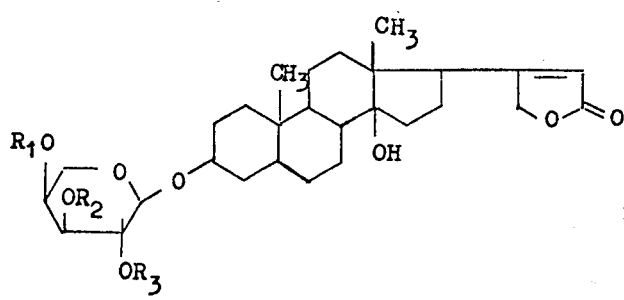

wherein
R$_1$, R$_2$ and R$_3$ are individually selected from alkanoyl or alkyl of up to 3 carbon atoms and wherein up to two of R$_1$, R$_2$ and R$_3$ can be hydrogen; or
R$_1$ and R$_2$ together can represent an acetal or ketal grouping containing from 2 to 10 carbon atoms.

2. Compound as claimed in claim 1, wherein R$_1$ is alkanoyl of up to 3 carbon atoms.

3. Compound as claimed in claim 1, wherein R$_2$ is alkanoyl of up to 3 carbon atoms.

4. Compound as claimed in claim 1, wherein R$_3$ is alkanoyl of up to 3 carbon atoms.

5. Compound as claimed in claim 1, wherein R$_2$ is alkyl of up to 3 carbon atoms.

6. Compound as claimed in claim 1, wherein R$_3$ is alkyl of up to 3 carbon atoms.

7. Compound as claimed in claim 1, wherein one of R$_1$, R$_2$ and R$_3$ is hydrogen.

8. Compound as claimed in claim 1, wherein R$_1$ and R$_2$, taken together, represent an acetal or ketal grouping containing from 2 to 10 carbon atoms.

9. Compound as claimed in claim 8, wherein R$_1$ and R$_2$ represent alkylidene.

10. Compound as claimed in claim 8, wherein R$_1$ and R$_2$ represent cycloalkylidene.

11. Compound as claimed in claim 8, wherein R$_1$ and R$_2$ represent aralkylidene.

12. Compound as claimed in claim 1, designated triacetyl-digitoxigenin-α-L-arabinoside.

13. Compound as claimed in claim 1, designated 3',4'-isopropylidene-digitoxigenin α-L-arabinoside.

14. Compound as claimed in claim 1, designated trimethyl-digitoxigenin-α-L-arabinoside.

15. Compound as claimed in claim 1, designated 2'-O-methyl-3',4'-isopropylidene-digitoxigenin-α-L-arabinoside.

* * * * *